United States Patent [19]

Cronson et al.

[11] Patent Number: 4,688,041

[45] Date of Patent: Aug. 18, 1987

[54] BASEBAND DETECTOR WITH ANTI-JAM CAPABILITY

[75] Inventors: Harry M. Cronson; Gerald F. Ross, both of Lexington, Mass.

[73] Assignee: Sperry Corporation, New York, N.Y.

[21] Appl. No.: 336,642

[22] Filed: Oct. 8, 1981

[51] Int. Cl.[4] .................................................. G01S 7/36
[52] U.S. Cl. ....................................... 342/17; 342/21
[58] Field of Search ................ 343/18 E; 342/16, 17, 342/19, 21

[56] References Cited

U.S. PATENT DOCUMENTS 4,122,452  10/1978  Richmond ............................. 342/19

Primary Examiner—T. H. Tubbesing
Attorney, Agent, or Firm—Howard P. Terry; Seymour Levine

[57] ABSTRACT

A method and apparatus for detecting a short pulse signal in the presence of an interfering jamming signal wherein the jamming signal is utilized as the local oscillator in a diode mixer when it is received at a sufficiently high level for efficiently mixing with a short pulse signal. When the received jamming level is insufficient to act as a local oscillator, an internal local oscillator signal is coupled to the diode to maintain an efficient mixing operation.

4 Claims, 4 Drawing Figures

BASEBAND DETECTOR WITH ANTI-JAM CAPABILITY

BACKGROUND OF THE INVENTION

1. Field of the Invention

The present invention relates to baseband radar systems and more particularly to the minimization of susceptibility of such systems to CW narrow band or spot jamming.

2. Description of the Prior Art

Radar systems using short pulses in the order of a nanosecond have a capability of providing range resolution and accuracy of fractions of a foot. These devices, however, though insensitive to multiple target deception and impulse type jammers, because of receiver range gates that are only a few nanoseconds wide, are vulnerable to electronic countermeasures (ECM) such as CW narrow band or spot jammers operating in the same spectral band as the baseband pulse. Incidence signals from spot jammers in this range present a multiplicity of half cycles within the range gate that appear as baseband pulses to the system's receiver, thus providing an opportunity for the jamming signal to exceed the system threshold with each cycle. Providing a narrow range gate to reduce the probability of false alarms with each cycle of CW signal concomitantly requires a moving range gate to cover the desired over-all range, thus adding an undesired complexity. To utilize the inherent range resolution and accuracy of baseband radar systems, a means for minimizing its susceptibility to narrow band jamming is required.

A prior art solution to this problem is disclosed in U.S. patent application Ser. No. 845,984 filed by Gerald F. Ross on Oct. 27, 1977 and assigned to the assignee of the present invention. Ross discloses a passive filter comprising a shorted stub of length l and characteristic impedance $R_0/2$ branching from a line of characteristic impedance $R_0$. This configuration exhibits a large insertion loss to a CW signal with a wavelength $\lambda_0$ when $l=k\lambda_0/2$. k being any integer, but passes a pulse length of $\tau$ with an insertion loss of 6 dB as long as $2l/v > \tau$, where v is the signal velocity along the line. Although this shorted stub filter provides the desired large differential insertion loss between a CW signal and a short pulse, its bandwidth is only of the order of 50 MHz. Multiple stage filter designs do not solve the problem since the differential insertion loss decreases as the bandwidth increases. Consequently, although a shorted stub may be useful in a circuit, a passive filter alone does not provide the desired immunity to spot jamming over a large dynamic range of jamming signal frequencies.

SUMMARY OF THE INVENTION

A baseband receiver with anti-jam capability in accordance with the principles of the present invention may comprise a Schottky diode and a back diode with the input terminals thereof switchably coupled to a receiving antenna and the output terminals thereof switchably coupled to an output terminal, which in turn may be coupled to the front end of a baseband CFAR receiver. Received signals are also coupled to a detector wherein the presence and level of a jamming signal is determined and a signal representative thereof is coupled therefrom to a logic circuit. When the detected jamming signal is below a predetermined level, signals generated in the logic circuit cause the switches to couple the back diode between the antenna and the output terminal of the detector and additionally couples an enabling signal to an oscillator circuit, which has an output terminal coupled to the back diode, thereby providing a local oscillator signal to the back diode. When the detected level of the jamming signal is above the first predetermined level, but below a second predetermined level, the logic circuit couples a disabling signal to the oscillator circuit, removing the local oscillator signal from the back diode. Under these conditions, the jamming signal coupled from the antenna along with the short pulse signal acts as the local oscillator signal for the back diode. This condition exists until the jamming signal level is above the second predetermined level, which is selected near the saturation level of the back diode, whereat the logic circuit causes the switches to switch from the back diode to the Schottky diode, thereby coupling the Schottky diode between the antenna and the output terminal of the converter. The Schottky diode, having a greater saturation level than the back diode, continues to operate as a high efficiency converter with the jamming signal acting as the local oscillator of the converter. This condition persists until the combined jamming and short pulse signals reach the saturation level of the Schottky diode.

DESCRIPTION OF THE PREFERRED EMBODIMENTS

Figure 1:
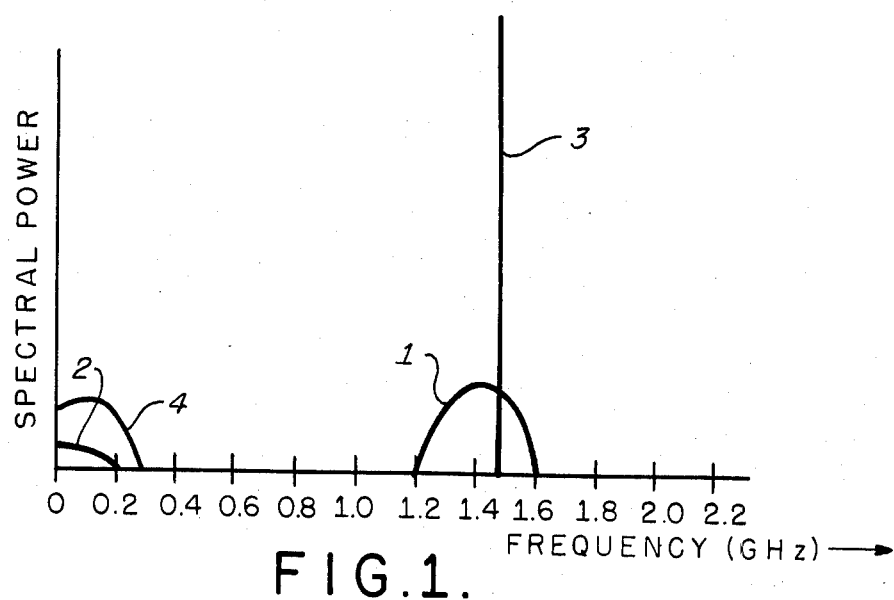
FIG. 1 is a spectral power versus frequency diagram useful in explaining the operation of a diode detector utilizing the jamming signal as a local oscillator.

When a low level short pulse signal, having a duration in the order of a few nanoseconds and a carrier signal frequency $f_0$, is detected by a diode of sufficient sensitivity, the output signal in the presence of a spot jammer having a frequency in close proximity to $f_0$ is appreciably greater than the detected output signal without the jammer. This apparent paradox is due to the increase in efficiency exhibited by the diode when used as a converter or mixer rather than as a rectifier. The situation in the frequency domain in shown in FIG. 1 wherein the instantaneous spectrum of a short pulse occupying the frequency region from 1.2 to 1.6 GHz is represented by curve 1. In diode rectification, this short pulse signal is transferred inefficiently to the 0 to 0.2 GHz region as indicated by the spectral curve 2. In the presence of a CW jammer, operating at 1.5 GHz as indicated by the spectral line 3, the diode utilizes the jamming signal as a local oscillator and mixes the short pulse therewith, converting the spectrum 1 to a spectrum in the region from 0 to 0.3 GHz, as indicated by the spectral curve 4. The spectral amplitudes of the connected spectrum 4 can be appreciably greater than the spectral amplitudes of the rectified pulse 2.

Figure 2:
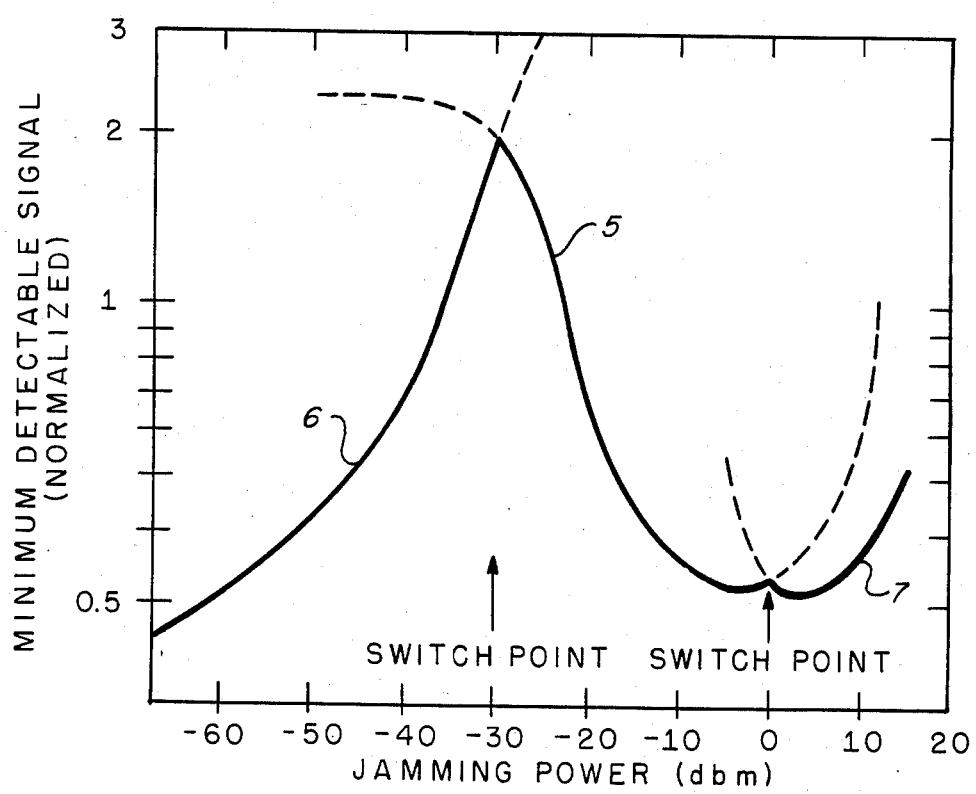
FIG. 2 depicts graphs of normalized minimum detectable signals versus jamming power for a back diode converter coupled to a local oscillator, for back diode detector operating without a local oscillator signal, and for a Schottky diode detector operating without a local oscillator signal.

Minimum detectable signal versus jamming power for a back diode converter is represented in FIG. 2 by the normalized curves 5 and 6. A minimum detectable signal in this figure represents an average of 18 hits out of 32 consecutive bursts detected by a CFAR receiver such as that disclosed in U.S. Pat. No. 3,983,422 issued to Nicholson et al in April 1975 and assigned to the assignee of the present invention. It should be noted from FIG. 2 curve 5 that the minimum detectable signal for a back diode decreases rapidly from −30 DBm of jamming power achieving and minimum value in the vicinity of −8 dBm and then increases rapidly as the jamming power increases from 0 dBm. In the region above 0 dBm, the diode rapidly approaches saturation, while in the region below −30 dBm, the jamming power is insufficient for local oscillator utilization and the diode operates as a rectifier rather than as a mixer.

Curve 6 in FIG. 2 is representative of the minimum detectable signal versus jamming power for the back diode when coupled to an internal local oscillator signal at a −8 dBm level. The back diode with the internal local oscillator signal exhibits a minimum detectable signal characteristic that increases with jamming power until, at a jamming power level of −30 dBm, a minimum detectable signal substantially equal to that of the back diode utilizing the jamming signal as the local oscillator is substantially equalled. This increase in minimum detectable signal is caused by the mixing of the jamming signal with the internal LO signal which produces a difference frequency in the same band as the mixed short pulse signal. The CFAR treats this product of local oscillator and jamming powers as noise and the net result is a decrease in sensitivity. Also included in FIG. 2 is a curve 7 of minimum detectable signal versus jamming power for a Schottky diode which has greater power handling capability than the back diode. Curve 7 indicates a marked improvement, over the back diode, in the detection sensitivity beyond 0 dBm jamming power levels. To obtain the greatest short pulse reception sensitivity, as indicated by the solid portions of curves 5, 6, and 7 in FIG. 2, a receiver switchable from internal local operation to jamming power mixing operation and between a back diode converter and a Schottky diode converter is required.

Figure 3:
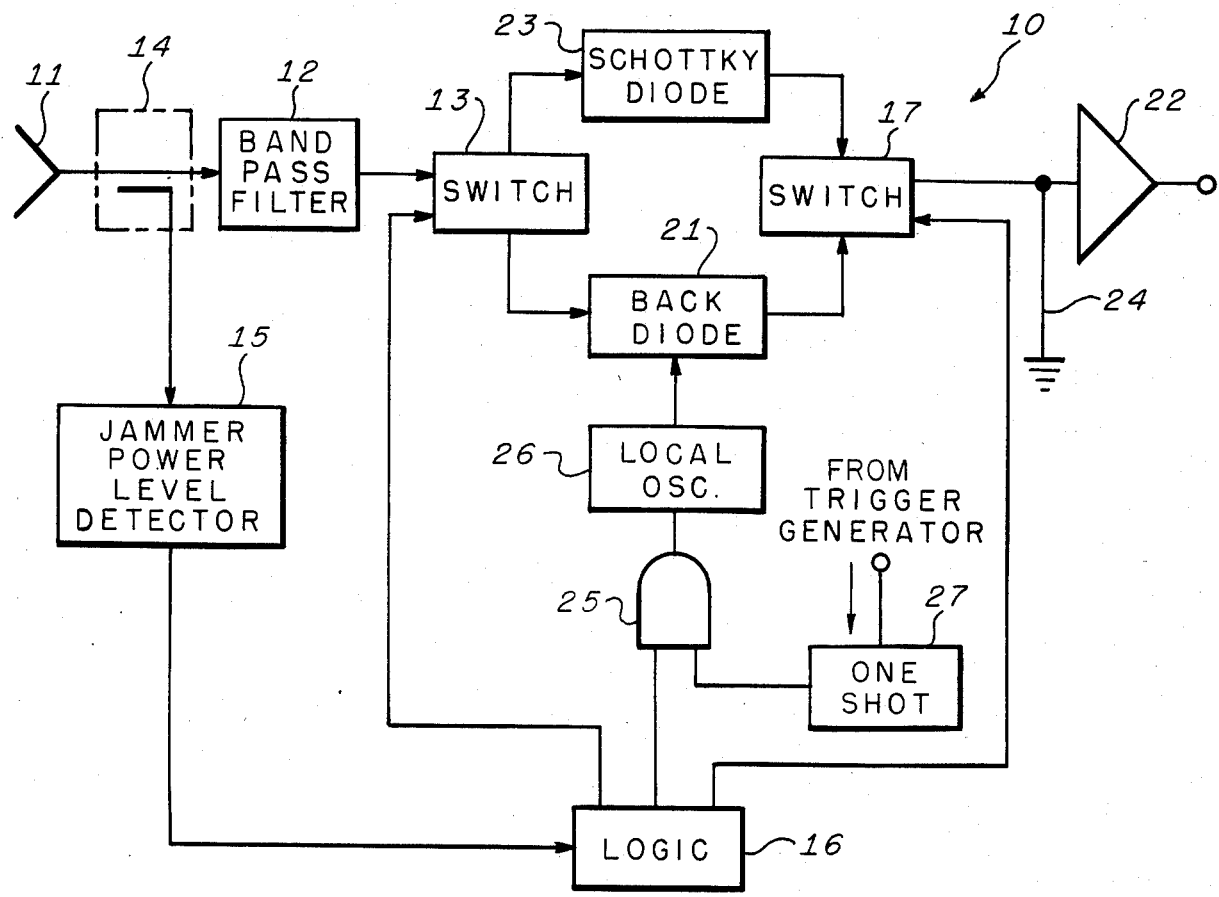
FIG. 3 is a block diagram of a preferred embodiment of the invention.

A block diagram of a receiver 10 capable of the operation above-described is shown in FIG. 3. Short pulse returns from targets of interest and jamming signals, when present, are received by an antenna 11, which may be of the type described in U.S. Pat. No. 3,659,203 issued to Lamensdorf et al in April 1972, are coupled via a bandpass filter 12, centered about the spectrum of the anticipated short pulse, to the input terminal of a switch 13, and via a directional coupler 14 to a jammer power level detector 15. A signal representative of the jammer power level is coupled from the detector 15 to a logic circuit 16 wherefrom signals are coupled to switches 13 and 17 which switchably couple a back diode 21, which may be a MA4C465 manufactured by Microwave Associates, Burlington, Mass., between bandpass filter 12 and the input terminals of a video amplifier 22 when the jammer power level is below 0 dB and a Schottky diode 23, which may be a ZBD57D also manufactured by Microwave Associates, therebetween when the jammer power level is above 0 dBm. A shorted stub filter 24 is coupled in parallel with the input terminals of video amplifier 22 to provide significant attenuation to CW signals coupled to the input terminals of the video amplifier 22. Details of this filter may be found in U.S. patent application Ser. No. 845,984, filed by Gerald F. Ross on Oct. 27, 1977 and assigned to the assignee of the present invention. Additionally, logic circuit 16 couples a high level signal to AND gate 25 when the jammer power level is below −30 dBm, enabling AND gate 25 to couple a starting pulse to local oscillator 26 when a one shot flip-flop 27, also coupled to AND gate 25, receives a pulse from the radar trigger generator (not shown). Local oscillator 26 provides a signal to the back diode 21 for the duration of the pulse from the one shot 27. Thus, the local oscillator signal required for efficient converter operation is provided when the jamming signal level is too low to be effective as a local oscillator. The states achievable by the above-described systems are summarized in the following table:

TABLE 1

| $P_j$ (dBm) | System States | | |
|---|---|---|---|
| | Back Diode | Schottky Diode | LO |
| <−30 | IN | OUT | IN |
| −30 to 0 | IN | OUT | OUT |
| >0 | OUT | IN | OUT |

Figure 4:
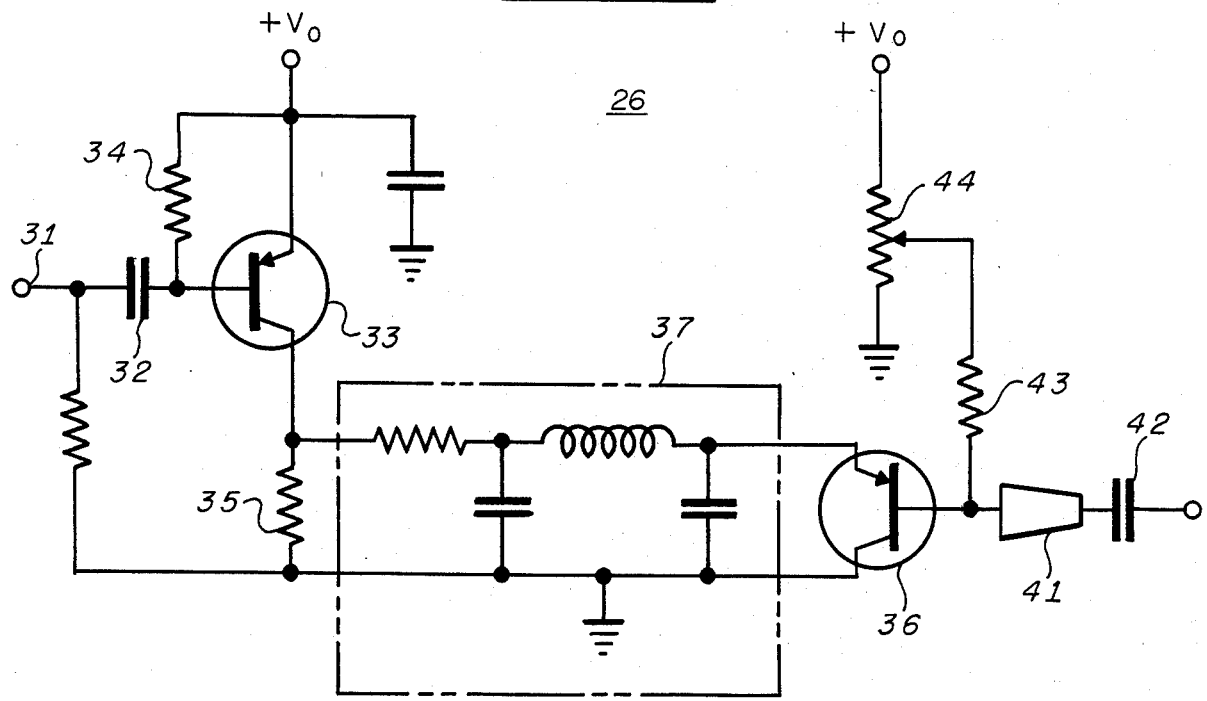
FIG. 4 is a schematic diagram of a burst local oscillator that may be employed in the embodiment of FIG. 3.

A schematic diagram of an oscillator suitable for use as the local oscillator 26 of FIG. 3 is shown in FIG. 4. Input terminal 31 is coupled to the output terminal of AND gate 25 and through capacitor 32 to the base of transistor 33, which is also coupled via resistor 34 to a positive d.c. voltage source not shown. The emitter of the transistor 33 is also coupled to the d.c. voltage source and the collector is coupled to ground via a resistor 35 and to the emitter of transistor 36 via a low pass filter 37. The collector of transistor 36 is coupled to ground while the base is coupled to the back diode 21 via an open-circuited tapered transmission line 41 and a capacitor 42, and also coupled via resistor 43 and a potentiometer 44 to the positive d.c. voltage (not shown). A pulse coupled from AND gate 25 to the input terminal 31 causes transistor 33, which may be a 2N2905, to conduct heavily thus coupling the positive d.c. voltage to the emitter of transistor 36, which may be a BFQ 23, via the low pass filter 37 causing it to oscillate at a frequency determined by the length of the open-circuited tapered transmission line 42; the feedback paths for sustaining this oscillation being the interelectrode capacitances of the transistor. In addition to providing the resonant circuit for the oscillator, the open-circuited tapered transmission line 42 serves as a matching network between the transistor 36 and the back diode 21.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An apparatus for detecting short pulse signals in an interfering signal environment comprising:
   signal input means for receiving short pulse and interfering signals;
   first means having input means coupled to said signal input means for detecting said short pulse signal and for providing signals representative of said detected short pulse signal at output means thereof;
   signal output means coupled to said output means of said first detecting means for providing said signals representative of said detected short pulse signals;

second means having input means coupled to said signal input means for detecting said interfering signal and for providing signals representative of said detected interfering signal at output means thereof;

logic means coupled to said output means of said second detecting means for providing a first signal at first output means of said logic means when said detected interfering signal is above a first predetermined level and a second signal at said first output means of said logic means when said detected interfering signal is below said first predetermined level; and oscillator means having output means coupled to said first detector means and control input means coupled to said first output means of said logic means for having an oscillating state when said second signal is coupled to said control input means and a non-oscillating state when said first signal is coupled to said control input means, whereby a local oscillator signal is coupled to said detecting means when said second signal is coupled to said control input means and said interfering signal acts as a local oscillator when said first signal is coupled to said control input means.

2. A short pulse detecting apparatus in accordance with claim 1 wherein said logic means provides a first switch control signal at second output means of said logic means when said interfering signal is below a second predetermined level and a second switch control signal at said second output means of said logic means when said interfering signal is above said second predetermined level and further including:

first switch means having input means coupled to said signal input means, first output means coupled to said input means of said first detecting means, second output means, and control input means coupled to said second output means of said logic means;

second switch means having first input means coupled to said output means of said first detecting means, second input means, output means coupled to said signal output means and control input means coupled to receive said second output means of said logic means;

third means coupled between said second output means of said first switch means and said second input means of said second switch means for detecting said short pulse signals in the presence of said interfering signals; and said first and second switch means positioned to couple said first detecting means between said signal input means and said signal output means when said first control signal is coupled thereto and positioned to couple said third detecting means between said signal input means and said signal output means when said second control signal is coupled thereto.

3. A short pulse detecting apparatus in accordance with claims 1 or 2 further including local oscillator activation means coupled between said first output means of said logic means and said control means of said local oscillator for causing said local oscillator to provide signals at selected time intervals.

4. A method for detecting short pulse signals in the presence of an interfering signal including the steps of:

coupling said short pulse signal and said interfering signal to detection means;

utilizing said interfering signal as a local oscillator when said interfering signal is above a predetermined level; and coupling a local oscillator signal to said detection means when said interfering signal is below said predetermined level.

* * * * *